United States Patent [19]

Barton

[11] Patent Number: 4,651,634

[45] Date of Patent: Mar. 24, 1987

[54] CUSTOM CONE MACHINE

[76] Inventor: Sherwin L. Barton, 11726 Vose St., N. Hollywood, Calif. 91605

[21] Appl. No.: 783,467

[22] Filed: Oct. 3, 1985

[51] Int. Cl.⁴ ............................................. A47J 37/00
[52] U.S. Cl. ....................................... 99/383; 99/332; 99/439; 219/524; 425/256; 425/451.9; 425/542; 426/391; 426/514
[58] Field of Search ................ 99/439, 442, 382, 383, 99/384, 426; 425/256, 542, 406, 412, 414, 450.1, 451.9, 442, 447, 436 R, 423; 426/139, 391, 496, 514, 515, 512, 523; 219/417, 523, 524

[56] References Cited

U.S. PATENT DOCUMENTS

| | | | |
|---|---|---|---|
| 1,063,981 | 6/1913 | Lanier | 426/391 |
| 1,097,576 | 5/1914 | Winder | 99/383 |
| 1,293,819 | 2/1919 | Lewison | 425/451.9 |
| 1,341,081 | 5/1920 | Sharp | 426/391 |
| 1,341,084 | 5/1920 | Spies | 99/383 X |
| 1,379,643 | 5/1921 | Meltz | 99/383 |
| 1,746,252 | 2/1930 | Glassner | 99/383 X |
| 2,473,402 | 6/1949 | Wood | 219/524 X |

Primary Examiner—Billy J. Wilhite
Attorney, Agent, or Firm—Rapkin, Gitlin, Moser & Schwartz

[57] ABSTRACT

A custom cone machine for the use on or off the place of dispersement for use of edible containers to serve varying types of food, such as dairy products, salads, etc. fresh and of varying ingredients commensurate with the type of food served. The machine is fully automatic in the timing, cooking and ejection of the finished cone. The injection of the batter requiring approximately 3 seconds, is with a hand held batter injector that does not require any particular skill in its use. Due to is being automatic in all phases of the cooking and ejection cycle, eliminates the handling of hot cones and equipment by the operator and is a distinct safety advantage over the present on-site cone making machines.

Due to its unique injection and cycling action varying shapes, designs and sizes of food or dairy products, edible serving containers can be produced in a like manner as of the cones by the design and shape of the cooking heads.

7 Claims, 7 Drawing Figures

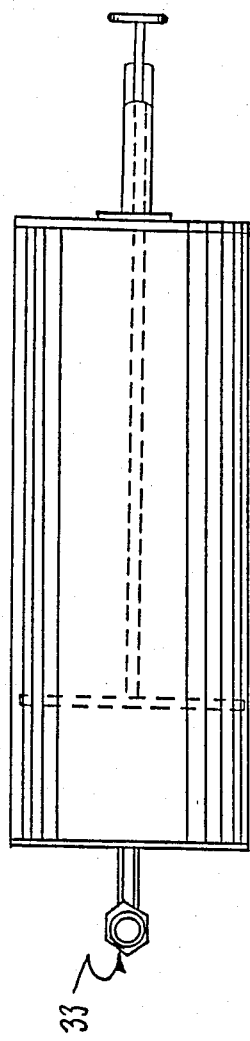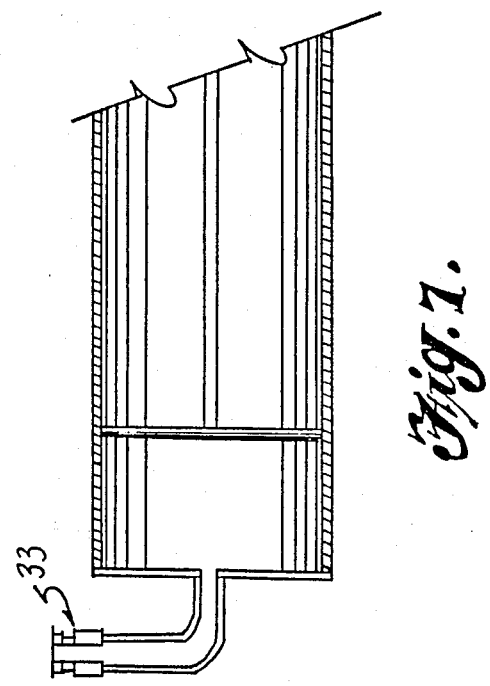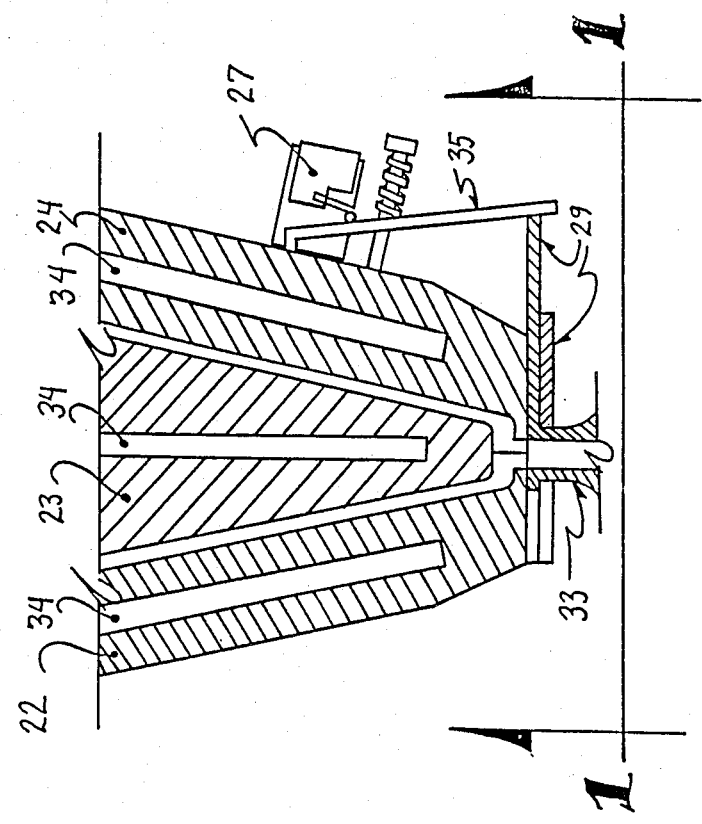

CUSTOM CONE MACHINE

BACKGROUND OF THE INVENTION

The on-site cone machines now in use are referred to as "heads" each head is a top opening flat waffle machine that is manually opened and closed with each use and the cone batter is manually poured on to the open head and manually closed for the cooking cycle - timing of the cooking cycle is either by a hand set timer or the operators instinctive guess as to cooking time, this can result in overdone or underdone flat cones, as the cooking cycle depends on the manual opening of the heads and the removal of the flat cone while still hot. The flat cone then must be wrapped around a wooden cone shape while still hot and kept in place until cool, this produces a cone that has a hole in the tip and several methods are used to close this opening i.e. jelly beans, paper cones or small pre-made cones. Due to having to roll the cone into a cone shape, the batter requires an excessive amount of sugar content and produces a sweet cone that is usable for serving sweet dairy products.

The device of the present invention produces edible cones automatically without any holes and of different batter ingredients to suit that particular food or dairy product to be served with safety to the operator.

In short, inject the cone mix and walk away. The cone is shaped, cooked, ejected and the machine resets itself for the next cone all automatically without the operator touching it.

SUMMARY OF THE INVENTION

In accordance with the invention, to provide a portable, ease of operation, safe machine for on-site production of fresh and varied types of edible containers for serving hot or cold food and dairy products.

BRIEF DESCRIPTION OF THE DRAWINGS

FIG. 5 is an enlarged fragmentary horizontal section taken on line 1—1 of FIG. 2;

FIG. 6 is a bird's eye view of the batter injector; and

FIG. 7 is a cutaway side elevation of the batter injector showing the injector piston front cap nozzle and injection tip.

DESCRIPTION OF THE PREFERRED EMBODIMENT AND OPERATION OF THE INVENTION

Figure 4:
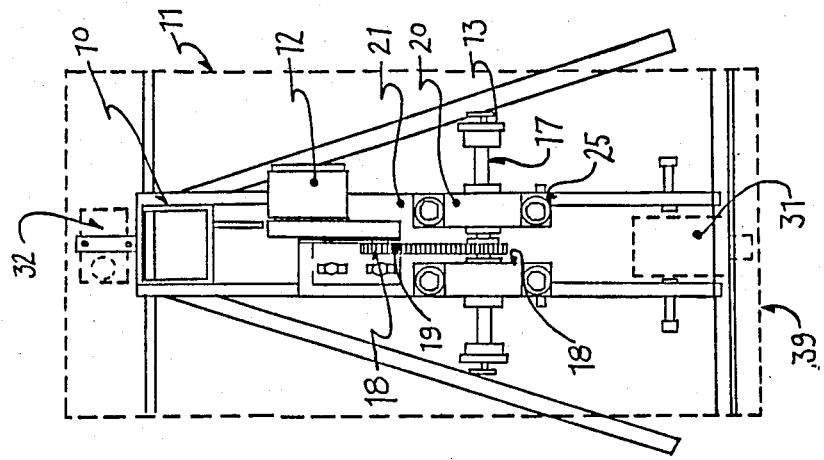
FIG. 4 is a bird's eye view of the present invention in the closed or cooking cycle.
Figure 3:
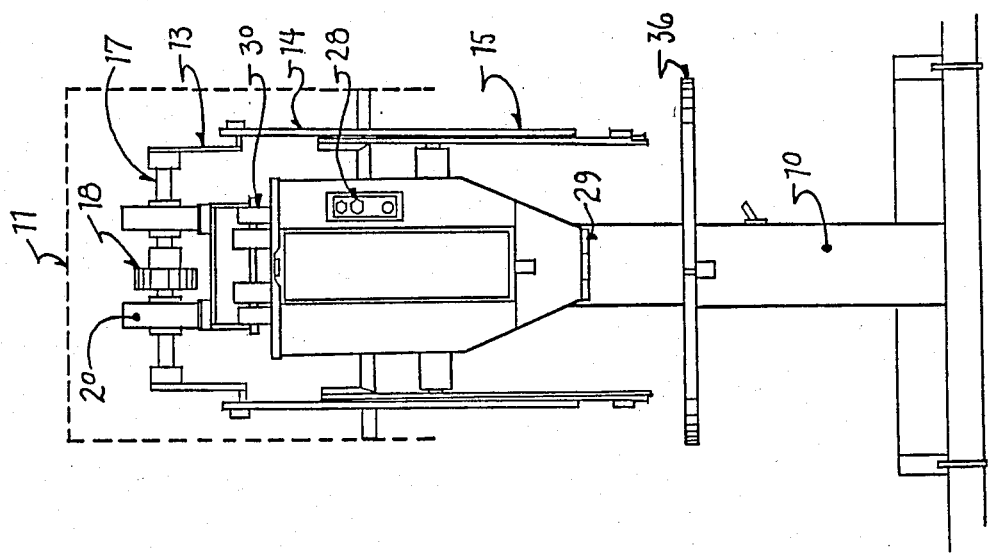
FIG. 3 is a front elevation of the present invention in the closed or cooking cycle.

Referring to the drawings, wherein like numerals designate like parts, the frame 10 is composed of a vertical support of heavy steel tubing with two angled horizontal support legs welded to the bottom of the vertical support see FIGS. 1, 2, 3 and 4 with two horizontal parallel cooking head supports welded to the top of the vertical support see FIGS. 1, 2, 3, and 4. The hood line 11 is shown in dotted lines for clarity of the drawings. The drive motor 12 is on the motor mount 21 and rigidly attached with bolts and a drive chain 19 tension adjustment screw to the motor mount 21 which in turn is rigidly attached with bolts to the frame 10 see FIGS. 1, 2, 3 and 4. The rotating motion from the drive motor 12 which is controlled by the on/off cooking cycle switch 39 see FIG. 4 is transferred to the rotating drive arm 13 through the drive sprockets 18 by the drive chain 19 through the drive shaft 17 which is supported by two drive bearings 20 at each end and transferred into an up and down motion through the drive arm 14 to the actuating arms 15 which in turn produces the opening and closing of the front and rear hinged forming heads 22 and 24 the necessary precise closing motion of the front and rear hinged forming heads 22 and 24 is controlled by the closing control springs 16 and stop 37.

Figure 2:
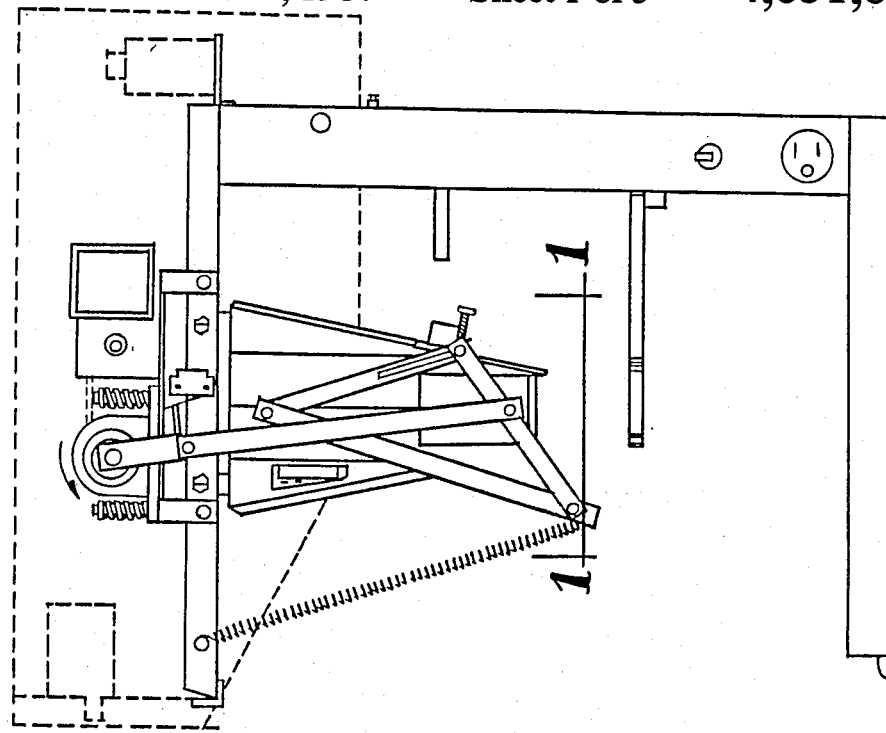
FIG. 2 is a side elevation of the present invention in the closed or cooking cycle.

To maintain an even steady pressure on the actuating arms 15 during the closed or cooking cycle see FIG. 2 the drive bearings 20 are mounted in a free up and down motion and held in place with vertical bolts and tension adjustable compression springs 25 the stopping of the forming heads 22 and 24 is accomplished by the trigger arm 38 opening the electrical circuit to the drive motor through the lever on/off switch 26 and stopping the machine in the cooking cycle or closed position see FIG. 2.

To start the machine in the cooking, ejection and closing cycle insert the injection tip 33 into the injection gate 29 see FIG. 5 and push the injector tip 33 into the injection gate 29 this puts the injection tip 33 in line with the injection hole in the forming heads 22 and 24 and at the same time forces the timer actuating arm 35 agains the injection timer switch 27 and starts the cooking time cycle that is controlled by the off delay cooking cycle timer 31. At the end of the cooking cycle the off delay timer 31 comes on and activates the on delay timer 32 which bypasses the lever on/off switch 26 and activates the drive motor 12 and starts the opening, ejection and closing cycle see FIGS. 1 and 2 the machine is now ready for the batter injection of the next cone automatically, this cycle is controlled by the on/off cooking cycle switch 39 see FIG. 4.

Figure 1:
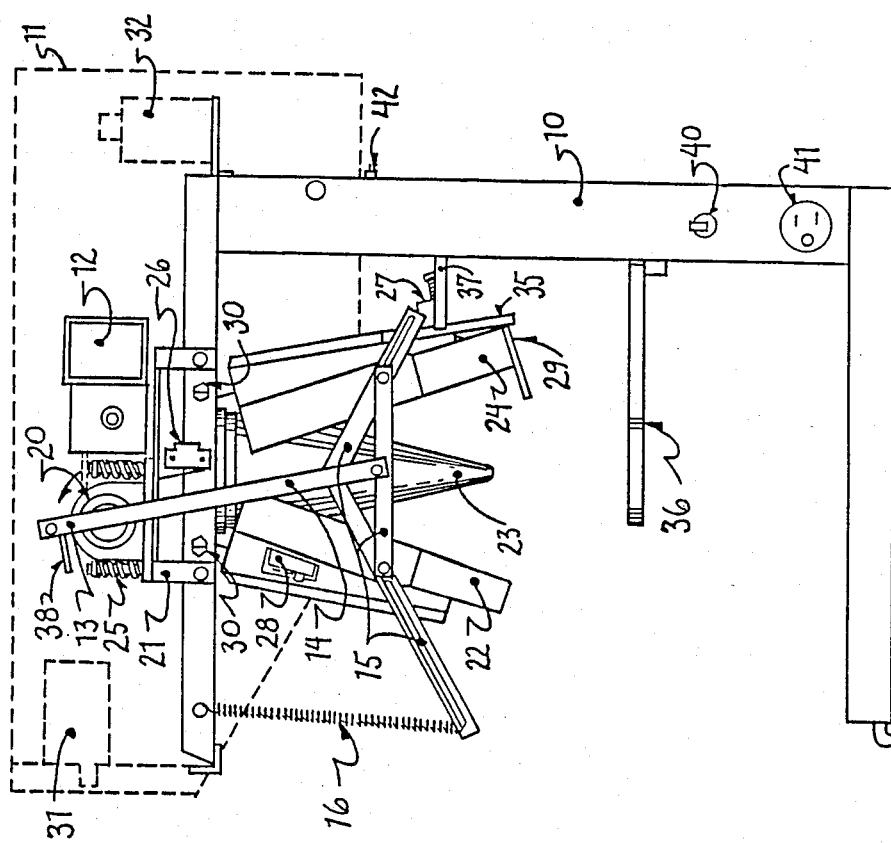
FIG. 1 is a side elevation of the present invention in the open or ejection cycle.

The stop 37 controls the position of both front and rear hinged forming heads in the open position for the ejection cycle see FIG. 1.

The front and rear hinged forming heads 22 and 24 see FIGS. 1 and 2 are hinged with a hinge bolt 30 rigidly secured to the frame 10 and the center fixed forming cone 23 see FIG. 1 is rigidly fixed to the frame 10.

The cooking temperature of the front and rear hinged forming heads 22 and 24 and the center fixed forming cone 23 is controlled by a thermostat 28 on each unit of the cooking head. The cooking heat is supplied through the cartridge heaters 34 see FIG. 5 in each unit of the cooking head which are controlled with the on/off heating switch 40 see FIGS. 1 and 2.

The power inlet 41 see FIGS. 1 and 2 is flush mounted to the frame 10.

The shut off safety normally on switch 42 see FIGS. 1 and 2 is mounted in the rear of the frame 10 in such a position that when the hood is in the open position it opens the normally on switch 42 and shuts off all power to the machine from the power inlet 41. This is a built in safety feature in the use of the machine.

The cone catcher 36 see FIGS. 1 and 2 is a double swing aside removable unit for the catching of the ejected hot cones.

The economics and advantages of the attachments should be readily apparent to those skilled in the arts without the necessity for any further detailed description.

I claim:

1. A device for manufacturing edible cone shaped containers comprising:

(A) a support frame;

(B) a motor;

(C) a pair of generally vertically oriented shaft members operably connected to said motor, each of said shaft members having a top portion and a bottom portion;

(D) a pair of generally horizontal cross-members each of which is pivotally connected to said bottom portion of each of said shaft members, respectively;

(E) a pair of first actuating arms each of which includes a longitudinally oriented slot formed integrally therewith for receiving a means attached to a respective first end of each of said cross-members for engagement with one of said first actuating arms in slidable relation therewith;

(F) a pair of second actuating arms each of which is pivotally connected, respectively, to a second end of each of said cross-members;

(G) a first cooking head having side panels and top and bottom portions, each of said side panels being pivotally connected, respectively, to each member of said pair of first actuating arms;

(H) a second cooking head in spaced opposed relationship with said first cooking head having side panels and top and bottom portions, each of said side panels being pivotally connected, respectively, to each member of said pair of second actuating arms;

(I) a cone shaped third cooking head positioned generally between said first and second cooking heads, said third head having a wide upper portion and a tapered bottom portion; and (J) an injection gate positioned in said bottom portion of said second cooking head.

2. The device according to claim 1 wherein said support frame comprises a vertical post, including a top and a bottom portion, first and second parallel spaced horizontal members connected to said top portion of said vertical post and first and second spaced horizontal members connected to said bottom portion of said vertical post.

3. The device according to claim 2 wherein said top portions of said first and second cooking heads, respectively, are hingedly connected to respective said first and second parallel spaced horizontal members of said support frame.

4. The device according to claim 3 comprising a motor housing, said housing including a control panel.

5. The device according to claim 1 wherein said motor in its power driven state drives each of said shaft members simultaneous in a rotary up and down motion to lift said cross-members and thereby cause said pair of first and second actuating arms in respective slidable and pivotal relation with the ends of said respective cross-members to converge and simultaneously cause the closure of said first and second cooking heads in sealed relation around said third head.

6. The device according to claim 1 comprising a batter injector, said injector including a tip through which a cooking batter is permitted to flow.

7. The device according to claim 6 wherein said tip and injection gate are sealably coupled so that the batter may be injected into the interior space defined by the closed said first, said second and third cooking heads to form a cone shaped edible container.

* * * * *